Jan. 2, 1940. L. L. HUELSDONK 2,185,732
AUTOMATIC CIRCUIT BREAKER FOR STOP LIGHTS
Filed Feb. 26, 1937
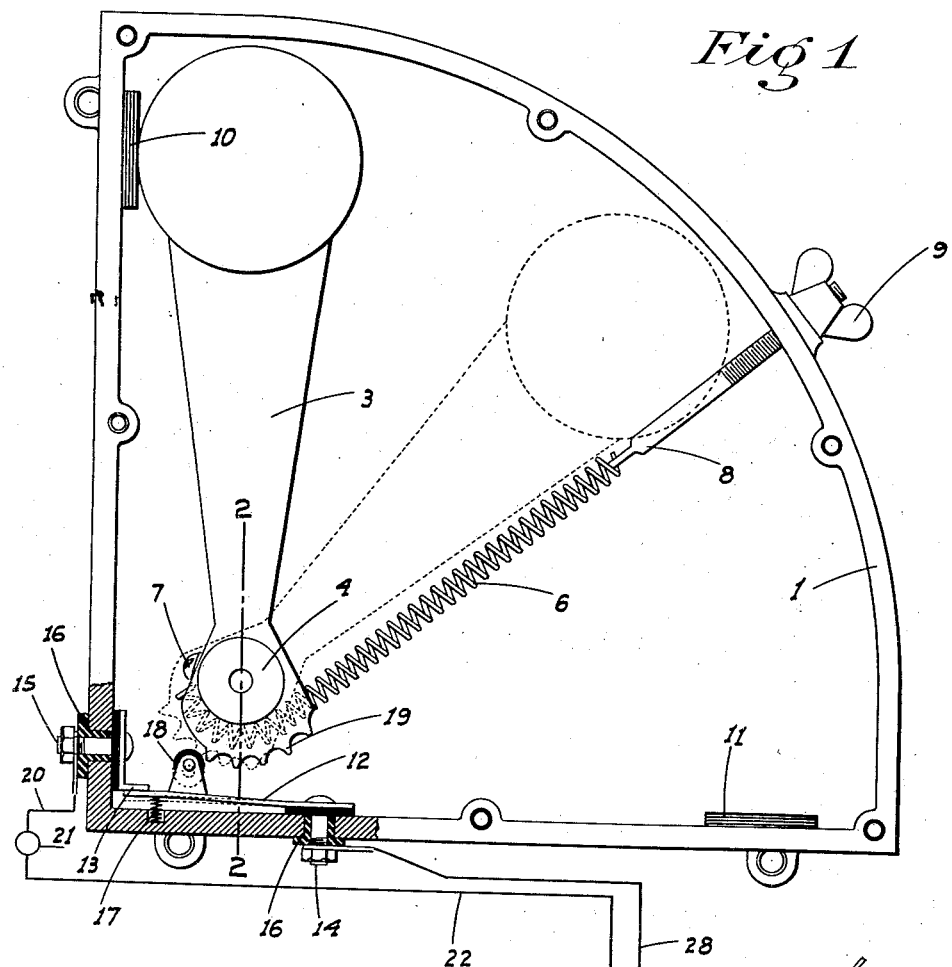
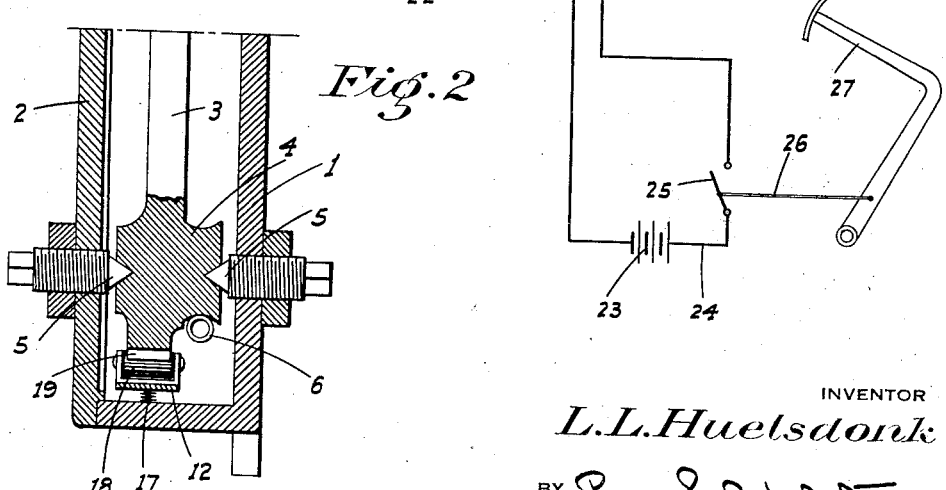
INVENTOR
L. L. Huelsdonk
BY
ATTORNEY Patented Jan. 2, 1940

2,185,732

UNITED STATES PATENT OFFICE 2,185,732

AUTOMATIC CIRCUIT BREAKER FOR STOP LIGHTS

Lewis L. Huelsdonk, Forest, Calif.

Application February 26, 1937, Serial No. 127,905

3 Claims. (Cl. 200—52)

This invention relates generally to an automatic circuit breaker for automobile stop lights and in particular relates to, and it is my principal object to provide, an automatic circuit breaker which will intermittently break an automobile stop light circuit when the brakes are applied thus causing the light to "blink" and give an effective signal. At night an automobile stop light is often confused with the tail light if the initial actuation of the stop light is not noticed by the driver of a following vehicle. However, if the stop light "blinks" whenver the automobile is slowing down, such distinguishable signal cannot confuse another driver.

Another object of my invention is to provide an automatic circuit breaker which will effect a rapid "blinking" when the brakes are applied hard and a slow "blinking" when the automobile is being decelerated slowly.

It is also my object to provide a circuit breaker which will intermittently break the circuit and cause the stop light to "blink" only with the initial deceleration of the automobile and will not break the circuit after the occurrence of the initial deceleration and the deceleration is continued in which event the stop light will, after the initial "blinking", remain on as long as the deceleration is continued.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a side elevation of the device with the cover plate removed and showing the inverted pendulum in inoperative position in full lines and in operative position in dotted lines. The view also includes a diagrammatic circuit.

Figure 2 is a fragmentary transverse sectional elevation on line 2—2 of Fig. 1.

Referring now more particularly to the characters of reference on the drawing, the device comprises an initially open sided case 1 provided with a side closure plate 2, the case being initially open sided for ease of manufacture and assembly. An inverted pendulum 3 is provided with a hub 4 at the lower end and pivoted between adjustable pivot pins 5 threaded through the sides of the case adjacent one lower corner. The case is adapted to be mounted on an automobile with the pivot pins adjacent the back end of the case and transversely of the vehicle.

A tension spring 6 extends tangent to the hub and at one end passes about the lower portion of hub 4 to one side of the pendulum and is secured thereto by bolt 7. The other end of the spring is secured to a connecting element 8 which extends through the forward edge of the case and is threaded and provided with a wing nut 9 whereby to provide means to adjust the tension of the spring.

The spring 6 normally acts to swing the pendulum rearwardly and to maintain it against a bumper 10 fixed within the case and on the rear, upstanding end of the same adjacent the top. Another bumper 11 is fixed within the case and on the bottom adjacent the front end thereof.

A contact strip 12 is mounted beneath the hub of the pendulum and normally engages a projecting contact element 13, which together form the circuit breaker. The strip 12 and element 13 are held in position by terminal bolts 14 and 15 respectively. The bolts and adjacent portions of the strip and contact element are maintained in insulated relation to the case by dielectric sleeve and washer elements 16. If desired, the contact element 13 may be slotted in order to allow the element to be adjusted vertically. A small compression spring 17 is disposed between the strip 12 and case and serves to assist in maintaining the strip in contact with the element 13.

A roller 18 of dielectric material is journalled on top of the strip 12 and in position to be engaged by spaced teeth 19 depending from the lower portion of the pendulum hub 4, to one side of the spring engaged portion thereof. The teeth are so disposed that none will engage the roller when the inverted pendulum is in a normal, vertical position or when the pendulum has swung forward a predetermined amount as will hereinafter appear.

The circuit I employ comprises a lead wire 20 which connects terminal bolt 15 with one terminal of the stop light 21, the other stop light terminal being connected by wire 22 to the battery 23. Wire 24 leads from the other side of the battery to one terminal of a normally open switch 25, which as usual is closed by movement of a connecting element 26 extending to the brake pedal lever 27. The circuit is completed by a wire 28 which extends from the other terminal of switch 25 to terminal bolt 14.

Operation

In use, my improved automatic circuit breaker functions in the following manner:

While the automobile is traveling at a relatively constant speed the inverted pendulum rests, under the tension of spring 6, in the substantially vertical position shown in full lines in Fig. 1.

When the brakes are applied, switch 25 is closed, closing the stop light circuit, the light at once being actuated. However, inertia throws the pendulum forward and about its pivot causing teeth 19 to each engage roller 18 one after the other. As each tooth engages the roller, strip 12 is depressed momentarily breaking the circuit and causing the stop light to blink intermittently. The pendulum will swing forward at a speed in direct proportion to the rate of deceleration which will result in "fast" or "slow" blinking of the stop light thus indicating to the driver of a following automobile whether an emergency stop is being made or otherwise.

If the automobile continues to decelerate after the pendulum has swung forward a predetermined distance or until the pendulum engages bumper 11 and the last tooth has cleared the roller, the stop light circuit will then be unbroken during such continued deceleration.

After the braking operation, the spring 6 returns the pendulum to its normal upright position. This spring may be adjusted to control the speed of forward swing of the pendulum as desired.

Also, to maintain the pivot and spring mechanism in proper working order, a bath of oil may be provided within the case.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A device for intermittently breaking the circuit of a vehicle stop light comprising a normally closed switch adapted to be interposed in the circuit, means to intermittently open the switch, inertia actuated means mounted in connection with and functioning to place said first named means in operation upon a relatively sudden deceleration of the vehicle and means included with said first named means to cause the switch to be closed and remain closed after a predetermined number of switch opening movements have been effected and with continued deceleration of the vehicle at a predetermined rate.

2. A device for intermittently breaking the circuit of a vehicle stop light comprising a pair of normally engaged contact elements forming a switch adapted to be interposed in the circuit, one element being movable relative to the other from a switch closing position, an inertia operated pendulum mounted adjacent the switch in a position to be moved from a predetermined position by inertia as the speed of the vehicle is retarded, a member mounted on and substantially rigid with the movable switch element, and elements rigid with the pendulum and disposed in a row concentric with the axis of the pendulum in position to intermittently and successively engage said member and move the same in a switch opening direction with the inertia controlled movement of the pendulum.

3. A device for intermittently breaking the circuit of a vehicle stop light comprising a pair of normally closed contact elements forming a switch and adapted to be disposed in the circuit, means yieldably mounting one element for downward separating movement relative to the other element, an inverted pendulum pivoted above the movable element for swinging movement in one direction from a normal upstanding position, spring means yieldably maintaining the pendulum in such position, a series of spaced teeth on the pendulum disposed in a circular path below and concentric with the axis of the pendulum and a member substantially rigid with the movable contact element projecting into the path of movement of the teeth but disposed ahead of the same when the pendulum is in its normal position, said member being of a size to project freely between the teeth whereby when the pendulum swings from said normal position the member will be intermittently engaged and depressed by the teeth to intermittently separate the movable contact element from the other element.

LEWIS L. HUELSDONK.